United States Patent [19]

Hiramitsu et al.

[11] Patent Number: 5,435,593
[45] Date of Patent: Jul. 25, 1995

[54] AIR BAG APPARATUS

[75] Inventors: Tetsushi Hiramitsu; Itizo Shiga; Tadashi Yamamoto; Hiroshi Ogawa; Takanobu Ikeda; Kozi Sakurai, all of Aichi, Japan

[73] Assignee: Toyoda Gosei Co., Ltd., Japan

[21] Appl. No.: 153,895

[22] Filed: Nov. 17, 1993

[30] Foreign Application Priority Data

Nov. 27, 1992 [JP] Japan .............................. 4-082182 U

[51] Int. Cl.⁶ ............................................. B60R 21/16
[52] U.S. Cl. .................................. 280/728.2; 280/731
[58] Field of Search ............... 280/728 A, 728 B, 731, 280/732, 743 R

[56] References Cited

U.S. PATENT DOCUMENTS 5,118,133  6/1992  Zushi et al. ..................... 280/728 A
5,167,427 12/1992  Baba ................................ 280/728 A

FOREIGN PATENT DOCUMENTS 3-189252 8/1991 Japan .

Primary Examiner—Kenneth R. Rice
Attorney, Agent, or Firm—Cushman Darby & Cushman

[57] ABSTRACT

An air bag apparatus includes a pad provided with a mounting piece portion extending downwardly from a bottom surface of the pad and having mounting holes. The mounting piece portion is fixed to a side wall of a bag holder in a state in which the mounting piece portion is held between a backplate and the side wall of the bag holder by rivets inserted into the mounting holes of the mounting piece portion and into mounting holes of the side wall of the bag holder and mounting holes of the backplate. Engagement portions for regulating an upward movement of the mounting piece portion are formed at a lower end portion of the mounting piece portion and the backplate except at those portions below the mounting holes. The engagement portions are formed to be recesses and projections which are adapted to engage are another.

8 Claims, 4 Drawing Sheets

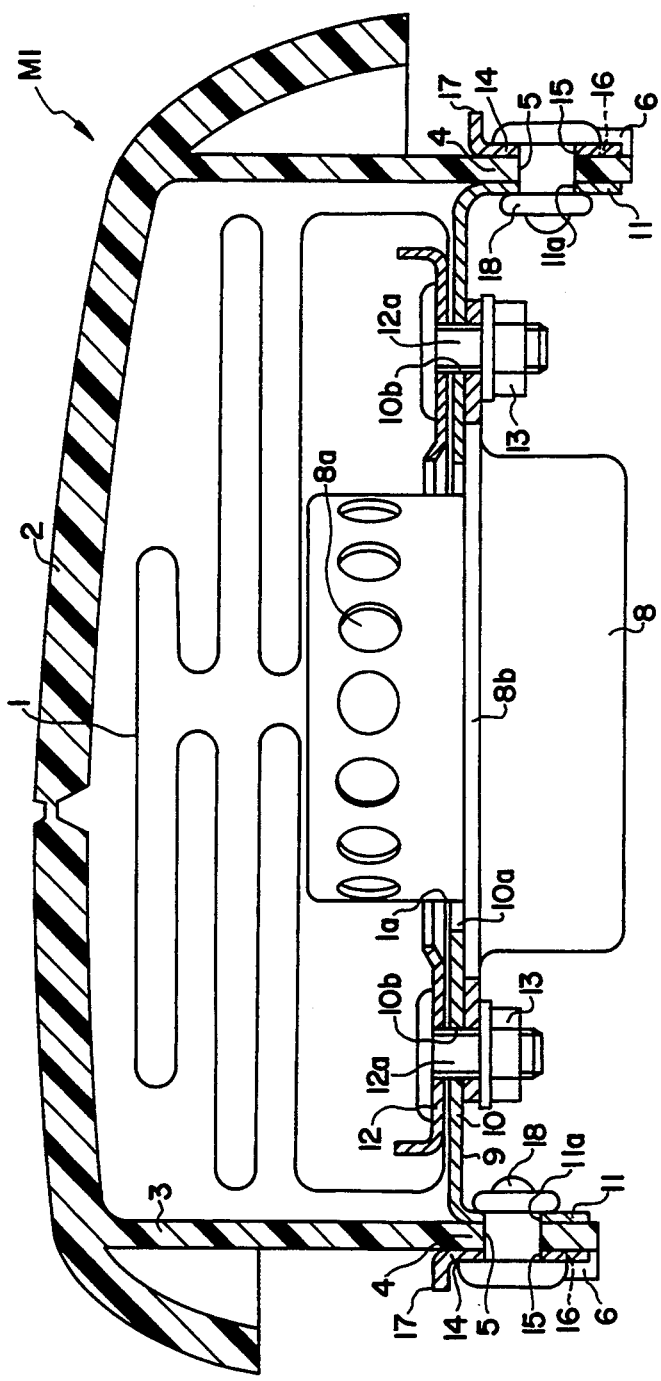
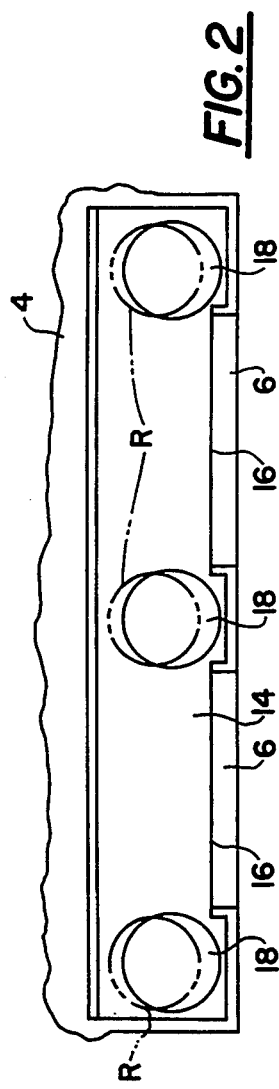

AIR BAG APPARATUS

BACKGROUND OF THE INVENTION

1. Field of the Invention

The present invention relates to an air bag apparatus disposed in a steering wheel of an automobile, an instrument panel or the like in front of the front passenger seat.

2. Description of Related Art

Hitherto, in an air bag apparatus having a pad mounted in a bag holder, a mounting piece portion, which extends from the bottom surface of the pad and is provided with mounting holes, is fixed to the side wall of the bag holder in a state in which the mounting piece portion is fastened between a backplate and the side wall of the bag holder by means of rivets inserted into the mounting holes of the mounting piece portion and mounting holes provided in the side wall of the bag holder and the backplate. The backplate, made of a metal, is disposed to increase the fastening strength of the mounting piece portion against the side wall of the metal bag holder because the pad, including the mounting piece portion, is formed from synthetic resin.

Since the pad is pulled up when the air bag is inflated, a flange which extends toward the backplate is provided in the lower end of the mounting piece portion in order to resist movement of the pad. The flange is brought into abutment with the end surface of the backplate so that the mounting piece portion of the pad is held between the backplate and the side wall of the bag holder (See Japanese Patent Unexamined Publication No. 3-189252).

In the prior art, it is necessary to fix the position of the mounting holes of the mounting piece portion, of the backplate, and of the side wall of the bag holder during a fixing operation using rivets. However, the mounting holes of the mounting piece portion of the pad must be aligned with other mounting holes while pressing a folded air bag during the fixing operation, thereby making the pad likely to shift because it is pushed by the air bag. Therefore, even if the lower end of the backplate is brought into abutment with the flange of the mounting piece portion, the mounting piece portion and the spacer shift horizontally relative to one another, and it is laborious to position the mounting holes.

Since the flange is formed over the entire lower end portion of the mounting piece portion, the mounting holes of the mounting piece portion, to which rivets are fixed, must be arranged in an upper position so that the flange does not interfere with the rivets. Riveting of the mounting piece portion, the backplate, and the upper portion of the side wall of the bag holder makes it likely that interference with devices provided at the pheriphery thereof such as an inflater for inflating the air bag will occur, thus making it difficult to perform riveting.

SUMMARY OF THE INVENTION

The present invention has been developed to solve the above-described problems found in the prior art. It is an object of the present invention to provide an air bag apparatus where the mounting piece portion of a pad is held between a backplate and the side wall of the bag holder so that positioning of the mounting holes of the mounting piece portion and of the backplate can be easily performed, and a fixation operation can be smoothly performed by fixation means.

To achieve the above-described object, according to the present invention, there is provided an air bag apparatus where a pad surrounding an air bag comprises a mounting piece portion extending downwardly and having mounting holes. The mounting piece portion is fixed to a side wall of a bag holder in a state where the mounting piece portion is held between a backplate and the side wall of the bag holder by fixing means inserted into the mounting holes of the mounting piece portion, the backplate, and the side wall of the bag holder. Engagement portions for regulating an upward movement of the mounting piece portions are formed at a lower end portion of the mounting piece portion and the backplate except those portions below the mounting holes. The engagement portions are formed as recesses and projections, which are engageable with one another.

In the air bag apparatus according to the present invention, it is easy to position mounting holes because the engagement between the engagement portion of the mounting piece portion of the pad and that of the backplate aligns the mounting holes with one another. Since the engagement portion of the mounting piece portion of the pad and that of the backplate are formed at the lower end portions of the mounting piece portion and the backplate, except for those portions below the mounting holes, it becomes possible to position the mounting holes at a place where interference with devices provided at the pheripheries thereof is not likely to occur and it is possible to smoothly perform a fixing operation by fixing means.

Therefore, in the air bag apparatus in accordance with the present invention, positioning of mounting holes of the mounting piece portion and of the backplate can be easily performed when the mounting piece portion of the pad is fixed to the side wall of the bag holder in a state in which the mounting piece portion is held between the backplate and the side wall of the bag holder by a fixing means, and a fixation operation can be smoothly performed by the fixing means.

BRIEF DESCRIPTION OF THE DRAWINGS

Other objects, features, and characteristics of the present invention, as well as the methods of operation and the functions of the related elements of the structure with become apparent upon consideration of the following description and the appended claims with reference to the accompanying drawings, all of which form a part of this specification. In the drawings, like reference numerals designate corresponding parts in the various figures. In the drawings:

FIG. 1 is a sectional view of a first embodiment of an air bag apparatus according to the present invention;

FIG. 2 is a view from direction II in FIG. 1 and showing a portion of the air bag apparatus;

DETAILED DESCRIPTION OF THE PRESENTLY PREFERRED EMBODIMENTS

Figure 3:
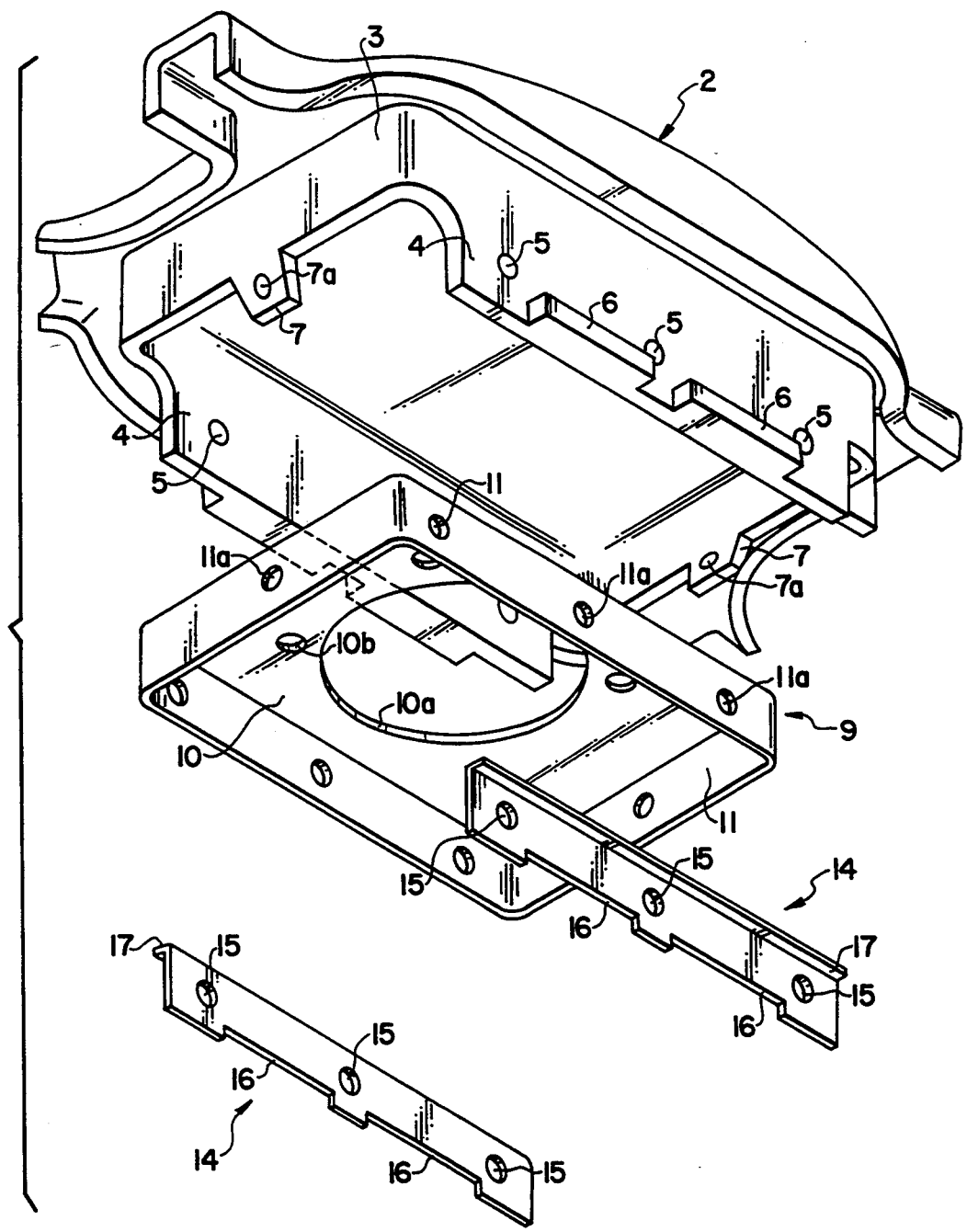
FIG. 3 is a partial, exploded perspective view of the first embodiment.

As shown in FIG. 1, an air bag apparatus M1 of the first embodiment comprises a folded air bag 1, a pad 2 that surrounds the air bag 1, an inflater 8 for supplying gas used to inflate the air bag 1, and a bag holder 9 for holding the air bag 1, the pad 2, and the inflater 8. The air bag apparatus M1 is adapted to be disposed in a steering wheel (not shown).

In the air bag 1, a peripheral edge of a circular opening 1a in a lower portion of the air bag 1 is pressed by an annular retainer 12 made of a metal sheet. The annular retainer 12 includes a plurality of bolts 12a integrally provided therewith. Nuts 13 are screwed onto the bolts 12a, thereby mounting the air bag 1 in the bag holder 9. The bolts 12a of the retainer 12 pass through a flange 8b of the inflater 8, so that the inflater 8 is held by the bag holder 9 as well. The bag holder 9, made of a metal sheet, comprises a rectangular bottom wall 10 and four side walls 11 extending downward from the peripheral edge of the bottom wall 10, as shown in FIGS. 1 and 3.

At the center of the bottom wall 10, an insertion hole 10a is formed, into which an upper portion of the inflater 8 provided with gas discharge openings 8a is inserted. Through holes 10b, into which the bolts 12a are inserted, are formed around the insertion hole 10a. Mounting means (not shown), such as nuts, for mounting the air bag apparatus M1 in a steering wheel are disposed in the bottom wall 10. A plurality of mounting holes 11a for fixing the pad 2 by using rivets 18, which serve as fixing means are formed in each side wall 11 at predetermined positions.

As shown in FIGS. 1 and 3, the pad 2 is formed from synthetic resin. A side wall portion 3 is formed on a back surface of the pad 2 and extends downward in a square cylindrical form. Two mounting piece portions 4 and 4 are formed at lower ends of each of the side wall portions 3, which are respectively positioned at the front side and the back side of the pad 2. Three mounting holes 5 into which the rivets 18 are inserted are formed in each of the mounting piece portions 4 and 4. Two projections 6 which serve as engagement portions projecting outwardly of the pad 2 are formed at the lower end of each mounting piece portion 4 except those portions below the mounting holes 5.

Reference numerals 7 (FIG. 3) denote mounting piece portions to be fixed by the rivets 18 to the side walls 11 of the bag holder 9 without using a backplate 14 (to be described later). Mounting holes 7a into which the rivets 18 are inserted, are formed in the mounting piece portions 7. In the case of the first embodiment, since a pulling force acting upon the inflation of the air bag 1 in the right and left direction of the pad is weak, it is possible to mount the pad 2 on the bag holder 9 without using the backplate 14. The backplate 14 for fixing the mounting piece portions 4 on the side walls 11 of the bag holder 9 is made of a metal sheet and two backplates 14 are used. Each of the backplates 14 is provided with three mounting holes 15 corresponding to the mounting holes 5 of each of the mounting piece portions 4. Two recesses 16, serving as engagement portions engageable with the projections 6 of each mounting piece portion 4 are formed at the lower end of the backplate 14 except for those portions below the mounting holes 15. Reference numeral 17 denotes a rib for reinforcement.

A description is now provided of an operation for mounting the air bag apparatus M1 of the first embodiment. Initially, the retainer 12 is arranged on an inner surface around the the opening 1a of the air bag 1, and the air bag 1 is folded. The air bag 1 and the inflater 8 are mounted by using the bolts 12a of the retainer 12.

Next, the mounting piece portions 4, 7 of the pad 2 are arranged on an outer peripheral surface of the side walls 11 of the bag holder 9, and the backplate 14 is disposed on an outer surface of each mounting piece portion 4. At this time, the projections 6 of each mounting piece portion 4 are fitted in the recesses 16 of each backplate 14.

Then, since the mounting holes 5 of the mounting piece portions 4 align with the mounting holes 15 of the backplates 14, the rivets 18 can be inserted into the mounting holes 11a of the bag holder 9, the mounting holes 5 of the mounting portions 4, and the mounting holes 15 of the backplates 14 only by aligning the mounting holes 11a with the mounting holes 15. The rivets 18 are plastically deformed, so that the mounting piece portions 4 can be fixed to the side walls 11 of the bag holder 9. Thereafter, the mounting means (not shown) of the bag holder 9 is used to mount the air bag apparatus M1 on the steering wheel. Therefore, in the air bag apparatus M1 of the first embodiment, the engagement of the projections 6 with the recesses 16, which are respectively engagement portions of the mounting piece portion 4 and the backplate 14 of the pad 2, makes it easy to position the mounting holes 5 and 15, as the mounting holes 5 and 15 align with are another.

Since the recesses 16 and the projections 6 are formed at the lower ends of the mounting piece portion 4 and the backplate 14 except those portions below the mounting holes 5 and 15, the mounting holes 5 and 15 can be arranged at lower portions of the mounting piece portion 4 and the backplate 14 where interference with devices provided at the pheripheries thereof or the like is not likely to occur. An operation for fastening the rivets 18, which is performed by using a rivetting gun or the like, can be smoothly performed.

If a flange is formed over the entire lower end of the mounting piece portion, as in the prior art, rivets R must be positioned in an upper position indicated by the two dot chain line in FIG. 2.

Figure 4:
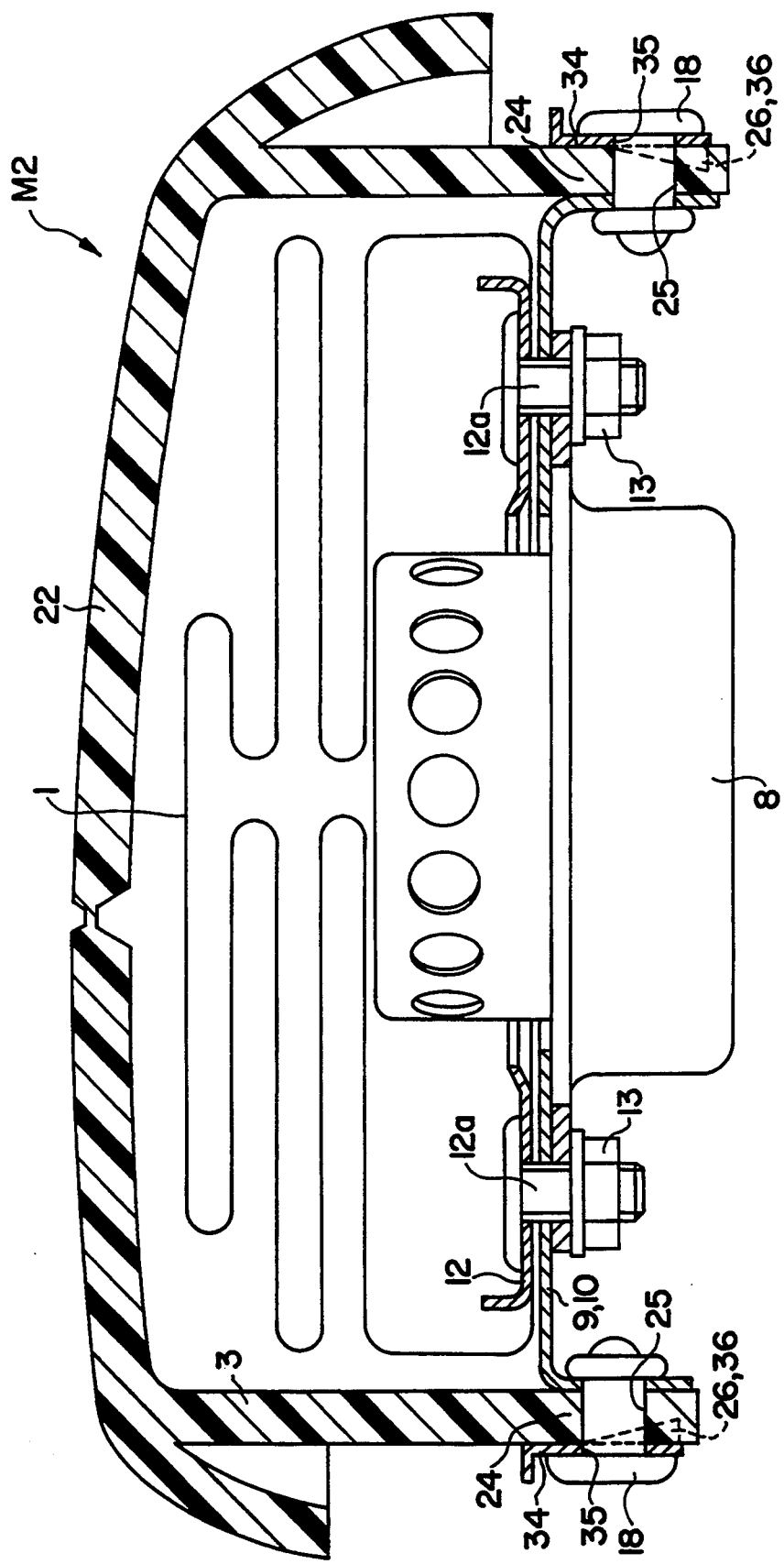
FIG. 4 is a sectional view of a second embodiment of an air bags apparatus according to the present invention.
Figure 5:
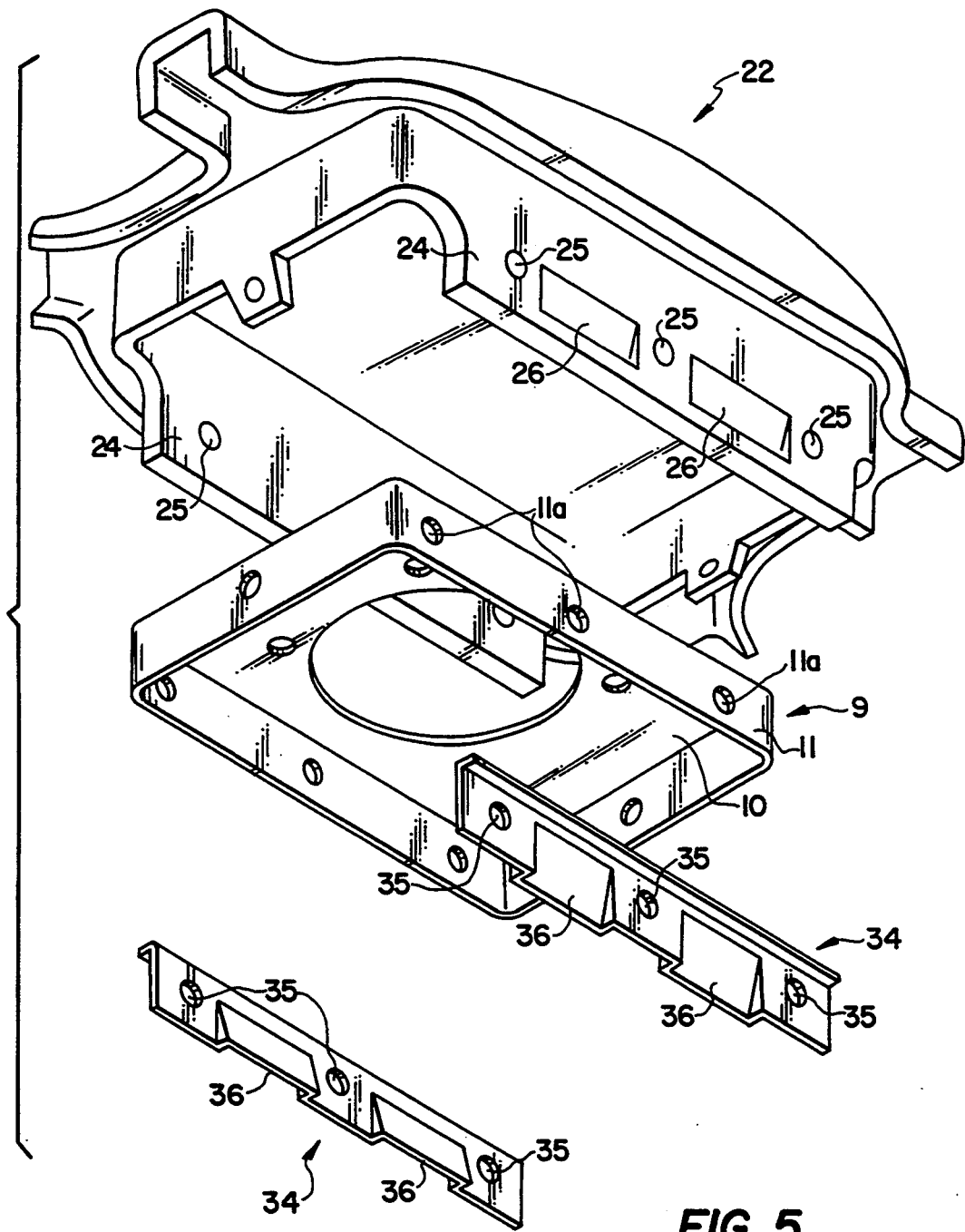
FIG. 5 is a partial, exploded perspective view of the second embodiment.

Although in the first embodiment, engagement portions formed in the mounting piece portion 4 of the pad 2 are formed of projections 6 and engagement portions formed in the backplate 14 are formed of recesses 16, the opposite may also be used. That is, the projections may be provided on the backplate and the recesses may be provided on the mounting piece portion as in the second embodiment shown in FIGS. 4 and 5.

An air bag apparatus M2 of the second embodiment is substantially the same as the first embodiment except for the mounting piece portions 24 of a pad 22 and a backplate 34. Three mounting holes 25, into which the rivets 18 are inserted, are formed in each of the two mounting piece portions 24. Also, two recesses 26 are formed at the lower end of each mounting piece portion 24 except for those portions below the mounting holes 25.

Three mounting holes 35 corresponding to the mounting holes 25 of the mounting piece portion 24 are formed on a backplate 34. Projections 36, which fit into the recesses 26 of the mounting piece portion 24, are formed at two places of the lower end of the backplate 34 except for those portions below the mounting holes 35.

Furthermore, in the air bag apparatus M2, it is easy to position the mounting holes 25 and 35 in the same manner as in the first embodiment, since the engagement of the recesses 26 with the projections 36, which are respectively engagement portions of the mounting piece portions 24 of the pad 22 and the backplate 34, makes the mounting holes 25 and 35 align with one another.

Since the recesses 26 and the projections 36 are formed at the lower ends of the mounting piece portion 24 and the backplate except for those portions below the mounting holes 25 and 35, the mounting holes 5 and 15 can be disposed at lower portions of the mounting piece portion 24 and the backplate 34 where interference with devices provided at the pheripheries thereof or the like is not likely to occur. Thus, an operation for fasting the rivets can be performed smoothly.

According to the second embodiment, the recesses 26 which are slightly recessed from the surface of the mounting piece portions 24 are used as engagement portions disposed in the mounting piece portions 24 of the pad 22. Thus, it is possible to forcibly remove the pad 22 during mold releasing when the pad 22 is molded. Even if the recesses 26 must be molded by using a slide core or the like, the slide mechanism of the molds can be made compact. As a result, it is easy to mold the pad 22.

Although in the air bag apparatuses M1 and M2 of the first and second embodiments, respectively, the rivets 18 are used as fixing means inserted into the mounting holes 5, 15, 25 and 35 of in the mounting piece portions 4 and 24 of the pads 2 and 22 and the backplates 14 and 34, it is also possible to use bolts, nuts or the like as fixing means.

In addition, in the first and second embodiments, engagement portions, which are formed of recessed or projecting portions that are engageable with one another and regulate the upward movement of the mounting piece portions 4 and 24 may be provided except at those portions below the mounting holes 5, 25 and 11a at the lower end portions of the mounting piece portions 4, 24 of the pads 2, 22, and the side walls 11 of the bag holder 9.

While the invention has been described in connection with what are presently considered to be the most practical and preferred embodiments, it is to be understood that the invention is not to be limited to the disclosed embodiments, but rather is intended to cover various modifications and equivalent arrangements included within the spirit and scope of the appended claims.

What is claimed is:

1. An air bag apparatus comprising:
   an air bag;
   an air bag inflator;
   a pad surround said air bag and said inflating means and having a bottom surface and a mounting piece portion extending downwardly from said bottom surface of said pad, said mounting piece portion having a lower end portion, first mounting through holes and first engagement portions provided at said lower end portion thereof except at those portions below said first mounting through holes;
   a bag holder on which said air bag and said inflating means are mounted, said bag holder having a side wall extending downwardly and second mounting through holes provided on said side wall,
   a backplate mounted exteriorly of said mounting piece portion so that said mounting piece portion is retained between said bag holder and said backplate, said backplate having third mounting through holes and second engagement portions provided thereon at spaced apart locations along said backplate, wherein said second engagement portions are adapted to engage said first engagement portions so as to initially align said first mounting through holes and said third mounting through holes and thereafter to restrain said mounting piece portion from upward and outward movement, and
   means for fixing said mounting piece portion of said pad, said side wall of said bag holder, and said backplate together by being inserted into said first, second, and third mounting through holes.

2. An air bag apparatus according to claim 1, wherein one of said first and second engagement portions comprises recesses and the other comprises projections.

3. An air bag apparatus according to claim 1, wherein said fixing means comprises rivets.

4. An air bag apparatus according to claim 3, wherein said first engagement portions comprise projections and said second engagement portions comprise recesses adapted to fit said projections.

5. An air bag apparatus according to claim 4, said first and second engagement portions are disposed between adjacent heads of said rivets.

6. An air bag apparatus according to claim 3, wherein said first engagement portions comprise recesses and said second engagement portions comprise projections adapted to fit such recesses.

7. An air bag apparatus according to claim 6, wherein said first and second engagement portions are disposed between adjacent rivets.

8. An air bag apparatus according to claim 6, wherein said first and second engagement portions have triangular cross-sections.

* * * * *